United States Patent Office 3,301,896
Patented Jan. 31, 1967

3,301,896
1-(CYCLOPROPYLCARBONYL) UREAS
David Frank Hayman, Vladimir Petrow, and Oliver Stephenson, all of London, England, assignors to The British Drug House Limited
No Drawing. Filed May 28, 1965, Ser. No. 459,889
Claims priority, application Great Britain, June 1, 1964, 22,579/64
10 Claims. (Cl. 260—553)

This invention is for improvements in or relating to urea derivatives and has special reference to 1-(cyclopropylcarbonyl) ureas which may additionally contain a methyl or phenyl group at positions 1 or 3 and a dihalo group at position 2 in the cyclopropyl ring.

It is an object of the invention to provide novel 1-(cyclopropylcarbonyl) ureas having the general formula (I) below and pharmaceutically acceptable compositions thereof which compounds may be of value on account of their therapeutic properties.

The invention provides novel 1-(cyclopropylcarbonyl) ureas having the general formula

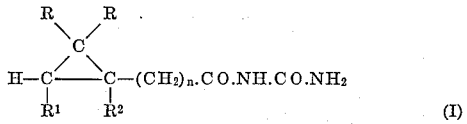

where R is hydrogen, chlorine or bromine, $R^1$ is hydrogen or phenyl, $R^2$ is hydrogen, methyl or phenyl and $n$ is 0 or 1. The novel compounds represented by Formula I are crystalline solids at room temperature. Some of the compounds described are potent anti-convulsant agents in the Maximum Metrazol Seizure and Anti-Strychnine tests in laboratory animals and 1-(2′,2′-dichloro-1-methylcyclopropylcarbonyl) urea (I; R=Cl, $R^1$=H, $R^2$=Me, $n$=0) for example is found to be more active in the foregoing tests than the known anticonvulsant compound 1-phenylacetyl urea; it is also a more potent CNS depressant than meprobamate possessing additionally a combination of hypnotic, muscle-relaxant and mild tranquilising properties.

The novel urea derivatives have low toxicities and, though preferably administered orally, the products of the invention and pharmaceutical preparations thereof can be equally well administered subcutaneously, intramuscularly or intravenously.

According to the present invention, there is provided a process for the preparation of 1-(cyclopropylcarbonyl) ureas having the general formula

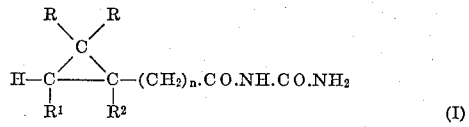

where R is hydrogen, chlorine or bromine, $R^1$ is hydrogen or phenly, $R^2$ is hydrogen, methyl or phenyl and $n$ is 0 or 1, which process comprises reacting an acid chloride having the general formula

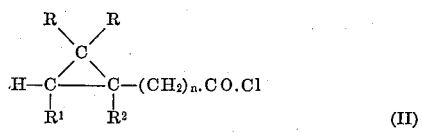

where R, $R^1$, $R^2$ and $n$ have the same meaning as above with urea. The reaction may be carried out by heating the reactants together, generally in the absence of solvent, to approximately 70 to 90° C. until an exothermic reaction occurs. Heating is temporarily stopped until the exothermic reaction is over when the reaction is completed by heating the mixture on the steam-bath for approximately 1 hour. The mixture is then cooled, stirred with water and the product collected and purified by crystallization from an appropriate solvent, for example ethanol or aqueous ethanol.

Occasionally, more vigorous conditions may be necessary for the reaction of the acid chloride (II) with urea. Thus it may be necessary to heat the reactants to a temperature in the region of 150° to 200° C. in the presence of an organic base, for example pyridine. In such cases the product is obtained by pouring the cooled reaction mixture into excess of dilute mineral acid followed by isolation and purification as described earlier.

Following is a description by way of example of methods of carrying the invention into effect.

EXAMPLE 1

*1-(2,2′-dichlorocyclopropanecarbonyl) urea*

(a) *2,2-dichlorocyclopropanecarboxylic acid.*—A solution of 1,1-dichloro-2-vinylcyclopropane (268 g.) in acetone (2 litres) was stirred mechanically and treated with sodium bicarbonate (45 g.). Powdered potassium permanganate (1048 g.) was then added portionwise during 4 hours, the mixture being cooled slightly to keep the reaction temperature from 10 to 20° C. Stirring was continued for 1 hour further when the acetone was boiled off, water (2.5 litres) was added to the residue, which was then rendered acid to Congo red by the careful addition of concentrated sulphuric acid to the ice-cooled stirred mixture. Ice-cooling was continued whilst sulphur dioxide was passed into the mixture until the manganese sludge was dissolved. The mixture was then filtered and the filtrate extracted with three 500 ml. portions of ether. The combined ether extracts were then extracted three times with 10 percent sodium carbonate solution. The combined aqueous alkaline extracts were then carefully acidified with 4N sulphuric acid and the liberated acid extracted with four 200 ml. portions of ether. The combined ethereal extractions were dried with anhydrous sodium sulphate and the ether boiled off. The residual oil was distilled at reduced pressure to yield an oil (231.5 g.) which was distilled at reduced pressure to yield the product, B.P. 90 to 100° C. at 0.5 mm. It solidified and had M.P. 75 to 76° C. (from light petroleum of B.P. 60 to 80° C.).

(b) *2,2-dichlorocyclopropanecarbonyl chloride.*—The foregoing acid (23 g.) was heated with thionyl chloride (60 ml.) on the steam-bath for 2 hours. The excess of thionyl chloride was distilled off at reduced pressure, then the product (22.3 g.) was obtained, B.P. 54 to 55°C. at 10 mm. ($\eta_D^{21.5}$=1.4910).

(c) *1-(2′,2′-dichlorocyclopropanecarbonyl) urea.*—An intimate mixture of the foregoing acid chloride (6.9 g.) with urea (9.6 g.) was heated on the steam-bath to 80°C. when an exothermic reaction occurred and heating was stopped for a short while. The reaction was completed by heating the mixture for 1 hour on the stem-bath. It was then cooled, stirred with water (100 ml.) and the product collected. It (6.0 g.) had M.P. 184 to 185°C. after crystallization from aqueous ethanol.

EXAMPLE 2

*1-(2′-2′-dibromocyclopropanecarbonyl) urea*

(a) *2,2-dibromocyclopropanecarboxylic acid.*—A solution of 1,1-dibromo-2-vinylcyclopropane (94.4 g.) in acetone (500 ml.) was treated with sodium bicarbonate (12 g.), stirred rapidly and treated portionwise with powdered potassium permanganate (227 g.) added during 3 to 4 hours, the temperature of the mixture being kept at 15 to 20°C. by external cooling. The mixture was allowed to stand at room temperature overnight when it was diluted with water (1 litre) and carefully acidified with 4 N sulphuric acid. The manganese dioxide was filtered off through a layer of "Hyflo" and the resultant filter-cake was extracted with two 500 ml. portions of ether. The original filtrate was concentrated at reduced pressure to remove acetone and the aqueous portion extracted with three 250 ml. portions of ether. The combined ether extracts were extracted with 10 percent sodium carbonate solution until free from acid when the ether layer was discarded. The aqueous alkaline layer was acidified with 4 N sulphuric acid to give the product as an oil which solidified on stirring. It (47.7 g.) had M.P. 94 to 96°C. A sample crystallized from light petroleum (B.P. 60 to 80°C.) had M.P. 95°C.

(b) *2,2 - dibromocyclopropanecarbonyl chloride.*—2,2-dibromocyclopropanecarboxylic acid (12.2 g.) was heated with thionyl chloride (30 ml.) on the steam-bath for 4 hours. The excess of thionyl chloride was distilled off at reduced pressure and the product (11.0 g.) obtained as an oil, B.P. 84° C., at 10 mm. ($\eta_D^{24}$=1.5509).

(c) *1 - (2′,2′-dibromocyclopropanecarbonyl) urea.*—A mixture of the foregoing acid chloride (9.0 g.) with urea (8.4 g.) was heated on the steam-bath until an exothermic reaction began and then at 90 to 100°C. for 1 hour. The cooled residue was stirred with water (50 ml.) when the product was collected, washed with water and dried. It (10.0 g.) had M.P. 193°C. after crystallization from methanol.

EXAMPLE 3

*1-(2′,2′-dichloro-1′-methylcyclopropanecarbonyl) urea*

A mixture of urea (12.0 g.) and 2,2-dichloro-1-methylcyclopropanecarbonyl chloride (9.37 g.) (prepared as described in application No. 44,141/63) was heated to 80°C. when an exothermic reaction occurred and then at 90 to 95°C. for 1 hour. The mixture was cooled and stirred with water when the product (10.4 g.) was collected, washed with water and dried. It had M.P. 168 to 170°C. after crystallization from aqueous ethanol.

EXAMPLE 4

*1-(2′,2′-dibromo-1′-methylcyclopropanecarbonyl) urea*

(a) *2,2 - dibromo - 1 - methylcyclopropanecarboxylic acid.*—This acid was prepared by the oxidation of 1,1-dibromo-2-methyl-2-vinylcyclopropane with potassium permanganate in acetone using the experimental procedure described for the preparation of 2,2-dibromocyclopropanecarboxylic acid in Example 2(a). It was obtained in 42 percent yield and had M.P. 115 to 117°C., after crystallization from light petroleum (B.P. 80 to 100°C.).

(b) *2,2 - dibromo-1-methylcyclopropanecarbonyl chloride.*—The foregoing acid was heated with an excess of thionyl chloride on the steam-bath for 4 hours as described in Example 2(b) for the preparation of 2,2-dibromocyclopropanecarbonyl chloride. It was obtained in 94 percent yield as a liquid of B.P. 82 to 84°C. at 3 mm., $\eta_D^{22}$=1.5403.

(c) *1-(2′,2′ - dibromo-1-methylcyclopropanecarbonyl) urea.*—A mixture of the foregoing acid chloride (13.0 g.) with urea (11.3 g.) was heated to 80°C., when an exothermic reaction occurred and heating was discontinued. The reaction was then completed by heating the mixture to 90 to 100°C. for 1 hour when it was cooled and stirred with water. The product was collected and washed with cold water. It (13.25 g.) had M.P. 188 to 189° C. after crystallization from aqueous ethanol.

EXAMPLE 5

*1-(2′,2′-dichlorocyclopropylacetyl) urea*

(a) *2,2-dichlorocyclopropyl carbinol.*—A solution of 2,2-dichlorocyclopropane carboxylic acid (46.5 g.) in anhydrous ether (250 ml.) was added slowly with stirring to a solution of lithium aluminium hydride (14.5 g.) in anhydrous ether (500 ml.) at such a rate that the ether was refluxing gently. After the addition was complete (1.5 hours) the mixture was refluxed gently for 1 hour further and was then cooled in a Drikold-ethanol bath. Nitrogen was passed into the mixture which was then treated carefully with water to decompose the excess of lithium aluminium hydride followed by 4 N sulphuric acid to dissolve lithium salts. The aqueous layer was extracted with ether and the combined ether extracts were washed with aqueous sodium bicarbonate solution and dried with anhydrous sodium sulphate. The ether was distilled off and the residual oil distilled at reduced pressure to yield the product (34.4 g.) B.P. 82 to 85°C. at 10 mm., $\eta_D^{21}$=1.4847.

(b) *1-bromomethyl - 2,2 - dichlorocyclopropane.*—Freshly distilled phosphorus tribromide (33.6 g.) was added slowly to a solution of 2,2-dichlorocyclopropyl carbinol (35.5 g.) in anhydrous ether (60 ml.) with stirring and cooling below −10° C. The mixture was allowed to stand at room temperature overnight and was then cooled below 0° C. and water added carefully to decompose the excess of phosphorus tribromide. The ether layer was isolated, washed acid-free with aqueous sodium bicarbonate solution and dried with anhydrous sodium sulphate. Evaporation of the ether yielded an oil which was distilled to yield the product (18.3 g.) B.P. 75° C. at 10 mm., $\eta_D^{22}$=1.5152.

(c) *2,2-dichlorocyclopropylacetonitrile.*—A solution of potassium cyanide (7.2 g.) in water (10 ml.) was added to a solution of 1-bromomethyl-2,2-dichlorocyclopropane (18.3 g.) in ethanol (20 ml.) and the mixture was heated under reflux for 10 hours. It was then cooled, just acidified with hydrochloric acid and evaporated to dryness at approximately 20 mm. pressure. The residue was partitioned between water and chloroform and evaporation of the chloroform layer yielded an oil which was distilled at reduced pressure to give the product (10 g.), B.P. 100 to 104° C. at 10 mm., $\eta_D^{25}$=1.4770.

(d) *Methyl-2,2-dichlorocyclopropyl acetate.*—A solution of the foregoing nitrile (9.35 g.) in methanol (90 ml.) containing water (1.12 g.) was cooled below 10° C. and saturated with hydrogen chloride. It was then heated under reflux for 4 hours when the methanol was distilled off at approximately 20 mm. pressure. The residue was diluted with water and the mixture extracted with three portions of ether. The combined ether extracts were washed with dilute aqueous sodium bicarbonate and then with water and dried wih anhydrous sodium sulphate. Evaporation of the ether yielded an oil which was distilled at reduced pressure to give the product (9.0 g.), B.P. 88 to 90° C. at 8 mm., $\eta_D^{20}$=1.4640.

(e) *2,2′-dichlorocyclopropylacetic acid.*—A mixture of the foregoing ester (6.9 g.) in ethanol (10 ml.) and water (20 ml.) containing sodium hydroxide (2.0 g.) was heated under reflux for 5 hours. It was then heated shortly at reduced pressure (about 20 mm.) to remove ethanol and was cooled and diluted with an equal volume of water. It was extracted with two portions of ether to remove non-acidic material and the ether extracts were discarded. The aqueous layer was acidified with concentrated hydrochloric acid, extracted with three portions of ether and the ether extracts dried with anhydrous sodium sulphate. Evaporation of the ether yielded an oil which was distilled to yield the product (5.3 g.) B.P. 110 to 115° C. at 1 mm. The material solidified after several weeks and a portion crystallized from light-petroleum (B.P. 40 to 60° C.) had M.P. 51 to 52° C.

(f) *2,2-dichlorocyclopropylacetyl chloride.*—A mixture of 2,2-dichlorocyclopropylacetic acid (4.64 g) and thionyl chloride (6.0 g.) was heated under reflux for 3 hours when excess of thionyl chloride was boiled off at reduced pressure and the residual oil was distilled to yield the product (4.8 g.), B.P. 78° C. at 5 mm., $\eta_D^{25}$=1.4862.

(g) *1 - (2′,2′ - dichlorocyclopropylacetyl) urea.*—This urea derivative was prepared by reaction of the foregoing acid chloride (4.15 g.) with urea (4.8 g.) as described in Example 4(c). It (3.55 g.) had M.P. 165 to 166° C. when crystallized from aqueous ethanol or from a mixture of benzene and light petroleum (B.P. 60 to 80° C.).

EXAMPLE 6

*1-(2,2'-dichloro-1'-methylcyclopropylacetyl)urea*

(a) *2,2 - dichloro-1-methylcyclopropylacetic acid.*—A solution of 2,2-dichloro - 1 - methylcyclopropanecarbonyl chloride (18.75 g.) in ether (60 ml.) was added slowly to a solution of 4 molar equivalents of diazomethane in ether (100 ml.) with cooling to 5 to 10° C. The mixture was allowed to stand overnight when the ether was distilled off at reduced pressure at a temperature below 30° C. The crude residual diazoketone was dissolved in dioxan (100 ml.) and the solution added dropwise with stirring to a mixture of freshly prepared silver oxide (2 g.), sodium carbonate (5 g.) and sodium thiosulphate pentahydrate (3 g.) in water (200 ml.). The reaction temperature was kept between 50 and 60° C. during the addition and was then raised to 90 to 100° C. for 30 minutes. The mixture was then cooled and extracted with ether to remove a brown insoluble oil. The aqueous fraction was acidified with dilute nitric acid and the oil which separated was extracted with three portions of ether. The ether extracts were dried with anhydrous sodium sulphate. Evaporation of the ether followed by distillation at reduced pressure yielded the product (4.8 g.), B.P. 105 to 115° C. at 1 mm. which had M.P. 108 to 110° C. after crystallization from light petroleum (B.P. 60 to 80° C.). The original ether extract was evaporated and the oil dissolved in dioxan and retreated with sodium carbonate (5 g.), hydrated sodium thiosulphate (3 g.) and silver oxide (5 g.) in water (200 ml.) using the above procedure. This yielded a further 3.48 g. of product.

(b) *2,2-dichloro-1-methylcyclopropylacetyl chloride.*— This was obtained in 87 percent yield by reaction of the foregoing acid (7.05 g.) with thionyl chloride (20 ml.) using the procedure described in earlier examples. It had B.P. 76 to 78° C. at 4 mm. and $\eta_D^{20.5} = 1.4888$.

(c) *1-(2,2'-dichloro - 1 - methylcyclopropylacetyl) urea.*—This product was obtained in 78 percent yield by reaction of the foregoing acid chloride (6.0 g.) with urea (7.2 g.) as described in Example 1(c). It had M.P. 204 to 206° C. after crystallization from 95 percent ethanol.

EXAMPLE 7

*Trans-1-(2',2'-dichloro-3'-phenylcyclopropane-carbonyl) urea*

(a) *Trans-methyl - 2,2 - dichloro - 3 - phenylcyclopropanecarboxylate.*—Trans-methylcinnamate (40.5 g.) was heated with stirring to 130 to 140° C. and treated in portions with sodium trichloroacetate (92.7 g.) which was added at such a rate that excessive frothing was avoided. Heating was continued for 45 minutes after the addition was complete then the mixture was cooled and stirred with water. The mixture was extracted with two portions of chloroform, the extracts were washed with water, dried with anhydrous sodium sulphate and evaporated. The residual oil was fractionated twice at reduced pressure to yield the product (33.4 g.) B.P. 102 to 108° C. at 0.6 mm. It had M.P. 65 to 66° C. after crystallization from light petroleum (B.P. 40 to 60° C.).

(b) *Trans-2,2-dichloro - 3 - phenylcyclopropanecarboxylic acid.*—The foregoing methyl ester (38.0 g.) was dissolved in dioxan (90 ml.) treated with concentrated hydrochloric acid (90 ml.) and the mixture heated under reflux for 3 hours. It was then evaporated to dryness at reduced pressure to yield the crude acid (35.8 g.) which is suitable for direct conversion to the acid chloride. A sample of the acid had M.P. 110 to 112° C. after crystallization from light petroleum (B.P. 40 to 60° C.).

(c) *Trans-2,2-dichloro-3 - phenylcyclopropanecarbonyl chloride.*—This compound was obtained in 92 percent yield by reaction of the foregoing crude acid (26.5 g.) with thionyl chloride (40 ml.), in the manner described in Example 1(b). It had B.P. 115 to 120° C. at 1 mm., $\eta_D^{24} = 1.5605$.

(d) *Trans-1-(2',2'-dichloro - 3 - phenylcyclopropanecarbonyl) urea.*—This urea derivative was prepared in 70 percent yield by heating the foregoing acid chloride (5 g.) with urea (5 g.) using the method described in Example 1(c). It had M.P. 199 to 200° C. after crystallization from aqueous ethanol.

EXAMPLE 8

*1-(2',2'-dichloro-1-phenylcyclopropanecarbonyl) urea*

A mixture of 2,2-dichloro-1-phenylcyclopropane-1- carboxylic acid chloride (7.5 g.) (prepared as described in our British provisional application No. 44,141/63) and urea (7.2 g.) with pyridine (5 ml.) was heated at 150° C. for 10 minutes and then at 190° C. for 5 minutes. It was then cooled, stirred with water and just acidified with 2 N hydrochloric acid. The crude material was collected, washed with water and dried. It (3.85 g.) had M.P. 188 to 190° C. after crystallization from aqueous ethanol.

EXAMPLE 9

*Cyclopropanecarbonyl urea*

An intimate mixture of cyclopropanecarbonyl chloride (10.45 g.) and urea (24 g.) was heated on the steam-bath when an exothermic reaction occurred and heating was stopped for a while. The mixture was finally heated at 90 to 100° C. for 1 hour, cooled and triturated with water (60 ml.). The product was collected and purified by two crystallizations from aqueous ethanol. It (7.5 g.) had M.P. 219 to 220° C.

We claim:

1. A 1-(cyclopropylcarbonyl) urea of the formula

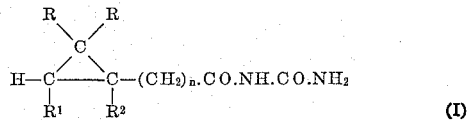

(I)

where R is chlorine or bromine, $R^1$ is hydrogen, methyl or phenyl, $R^2$ is hydrogen, methyl or phenyl and $n$ is 0 or 1.

2. 1-(2',2'-dichlorocyclopropanecarbonyl) urea.

3. 1-(2',2'-dibromocyclopropanecarbonyl) urea.

4. 1-(2',2'-dichloro - 1' - methylcyclopropanecarbonyl) urea.

5. 1-(2',2'-dibromo - 1' - methylcyclopropanecarbonyl) urea.

6. 1-(2',2'-dichlorocyclopropylacetyl) urea.

7. 1 - (2',2' - dichloro - 1' - methylcyclopropylacetyl) urea.

8. Trans-1-(2',2'-dichloro - 3' - phenylcyclopropanecarbonyl) urea.

9. 1-(2',2'-dichloro - 1 - phenylcyclopropanecarbonyl) urea.

10. Cyclopropanecarbonyl urea.

References Cited by the Examiner

UNITED STATES PATENTS 3,129,246    4/1964    Harris et al. _____ 260—552

OTHER REFERENCES

Umemoto et al.: Pharmaceutical Society of Japan Journal, vol. 83, pp. 753–6 (1963).

ALEX MAZEL, *Primary Examiner.*

HENRY R. JILES, *Examiner.*

JOSEPH A. NARCAVAGE, *Assistant Examiner.*